United States Patent
Feltström et al.

(10) Patent No.: US 6,768,795 B2
(45) Date of Patent: Jul. 27, 2004

(54) SIDE-TONE CONTROL WITHIN A TELECOMMUNICATION INSTRUMENT

(75) Inventors: Alberto Diego Jimenez Feltström, Löberöd (SE); Mats Ormin, Malmö (SE); Ulf Axel Lindgren, Lund (SE); Joakim Persson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 571 days.

(21) Appl. No.: 09/758,665

(22) Filed: Jan. 11, 2001

(65) Prior Publication Data

US 2002/0090078 A1 Jul. 11, 2002

(51) Int. Cl.[7] .............................................. H04M 9/00
(52) U.S. Cl. ............. 379/391; 379/390.03; 379/390.01; 379/392
(58) Field of Search ........................ 379/406.01, 390.01, 379/399.01, 400, 391, 392, 392.01, 413.02, 387.01, 388.03, 388.06, 388.07, 390.02, 390.03, 406.08; 455/63; 370/286, 290

(56) References Cited

U.S. PATENT DOCUMENTS

| | | | |
|---|---|---|---|
| 5,467,394 A | | 11/1995 | Walker et al. ............... 379/392 |
| 5,495,527 A | * | 2/1996 | Rollhaus, Jr. et al. ...... 379/387 |
| 5,544,242 A | * | 8/1996 | Robinson .................... 379/390 |
| 5,553,134 A | * | 9/1996 | Allen et al. ................. 379/387 |
| 5,640,450 A | | 6/1997 | Watanabe .................... 379/392 |
| 5,649,008 A | | 7/1997 | Bader et al. ................. 379/392 |
| 5,909,432 A | * | 6/1999 | Arends et al. .............. 370/261 |
| 6,282,176 B1 | * | 8/2001 | Hemkumar ................. 370/276 |
| 6,594,359 B1 | * | 7/2003 | Park ........................... 379/391 |

FOREIGN PATENT DOCUMENTS

| | | |
|---|---|---|
| EP | 0592787 A1 | 4/1994 |
| EP | 0 776 113 A2 | 5/1997 |
| JP | 60148259 | 8/1985 |
| JP | 05260158 | 10/1993 |
| JP | 06209362 | 7/1994 |
| JP | 09181817 | 7/1997 |
| WO | WO 99/11045 | 3/1999 |
| WO | WO 99/11047 | 3/1999 |

OTHER PUBLICATIONS

European Patent Office Standard Search Report, File No. RS 106333, Oct. 26, 2001, pp. 1–4.

"Introduction to DSP," Bores Signal Processing, Jan. 10, 2000.

* cited by examiner

Primary Examiner—Rexford Barnie
(74) Attorney, Agent, or Firm—Jenkens & Gilchrist, P.C.

(57) ABSTRACT

A side-tone control unit for a telecommunication instrument is configured to include a side-tone amplifier having a transfer function selectively controlled in accordance with a set of amplifier parameters, and a side-tone controller, coupled to the side-tone amplifier, for selectively applying the set of amplifier parameters to the side-tone amplifier based on the detected energy of an uplink signal and the detected energy of a downlink signal. The side tone controller can select a particular set of amplifier parameters by indexing a table in accordance with quantized values of the detected uplink signal energy and the detected downlink signal energy.

14 Claims, 4 Drawing Sheets

SIDE-TONE CONTROL WITHIN A TELECOMMUNICATION INSTRUMENT

BACKGROUND OF THE INVENTION

1. Technical Field of the Invention

The present invention relates in general to the field of telecommunications, and in particular, by way of example but not limitation, to side-tone control within a telecommunication instrument.

2. Description of Related Art

Conventional telecommunication instruments, such as wireline telephones, wireless or cordless phones and cellular handsets, typically employ a side-tone amplifier and associated circuitry that add a portion of an uplink signal produced by the microphone to a downlink signal received from a party at the far-end of a connection ("far-end party") to generate an output signal supplied to the earpiece speaker (earphone). A purpose of the side-tone amplifier is to allow people to hear their own voices in an earphone and therefore compensate for the fact that at least one ear is completely or partially covered by an earphone. Without a side-tone amplifier, people may experience a loss of hearing while speaking into an instrument's microphone, and as a result, may be unable to adequately control the volume of their voices due to inappropriate audio feedback.

Although a side-tone amplifier may enhance a user's ability to communicate with a far-end party, the side-tone amplifier also introduces significant problems when the telecommunication instrument is operated in a noisy environment. In a typical configuration, a side-tone amplifier generates a side-tone signal based on the acoustic signals picked up by the microphone. Because the side-tone signal is combined with the downlink signal received from the far-end party to produce the output signal supplied to the earphone, the side-tone signal may significantly degrade the quality of the output signal. In a noisy environment, for example, background noise picked up by the microphone will be combined with the downlink signal. As a result, the background noise included in the side-tone signal may significantly decrease the signal-to-noise ratio of the output signal, and partially or completely mask the downlink signal.

Existing approaches have attempted to alleviate these problems by incorporating volume controls that enable a user to selectively control the output power of an earphone. The effectiveness of this approach, however, is limited by the quality and output power limitations of the earphone, and health considerations may further limit the effectiveness of this approach because a high volume output may damage the user's hearing mechanism.

Other existing approaches utilize a gain control mechanism, which adjusts the gain of a side-tone amplifier in response to a detected power level of the uplink signal. For example, the gain control mechanism can decrease the gain of the side-tone amplifier in response to the power level of the uplink signal exceeding a predetermined threshold, and increase the gain of the side-tone amplifier in response to the power level of the uplink signal falling below a predetermined threshold. These approaches, however, adjust the gain of the side-tone amplifier based solely upon the power level of the uplink signal, and therefore fail to take into account other various side-tone control requirements that arise from a two-way conversation involving both an uplink signal and a downlink signal. Furthermore, the side-tone amplifiers employed in these existing approaches are configured with a fixed frequency response. Such a response prevents these approaches from further enhancing the quality and intelligibility of the output signal through adjustment of the side-tone amplifier's frequency response so as to allow a user to better understand the speech signals received from a far-end party.

Therefore, in view of the significant deficiencies of existing approaches, there is a need for an approach that can more effectively provide side-tone control within a telecommunication instrument.

SUMMARY OF THE INVENTION

The deficiencies of the prior art are overcome by the method and apparatus of the present invention. For example, as heretofore unrecognized, it would be beneficial to provide side-tone control within a telecommunication instrument by measuring the energy of an uplink signal and the energy of a downlink signal, selecting amplifier parameters for controlling a transfer function of a side-tone amplifier based on the energy of the uplink signal and the energy of the downlink signal, and applying the amplifier parameters to the side-tone amplifier. The amplifier parameters can be selected to control the gain of the side-tone amplifier, the frequency response of the side-tone amplifier, or both the gain and the frequency responses of the side-tone amplifier based on the energy of the uplink signal and the energy of the downlink signal.

In one embodiment of the present invention, a side-tone control unit is configured to include a side-tone amplifier having a transfer function selectively controlled in accordance a set of amplifier parameters, and a side-tone controller, coupled to the side-tone amplifier, for selectively applying the set of amplifier parameters to the side-tone amplifier based on the detected energy of an uplink signal and the detected energy of a downlink signal. The side tone mechanism can also include a table of amplifier parameters that stores a plurality of sets of amplifier parameters, so that the side-tone controller can be configured to select the set of amplifier parameters from the plurality of sets of amplifier parameters by indexing the table in accordance with quantized values of the detected uplink signal energy and the detected downlink signal energy.

An important technical advantage of the present invention is that it enhances the quality and intelligibility of an output signal supplied to an earphone.

Another important technical advantage of the present invention is that it provides more effective side-tone control by taking into account the varying needs of side-tone control that occur during a two-way conversation.

Yet another important technical advantage of the present invention is the ability to significantly improve the signal-to-noise ratio of a downlink signal when the telecommunication instrument is operated in a noisy environment.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

Figure 1:
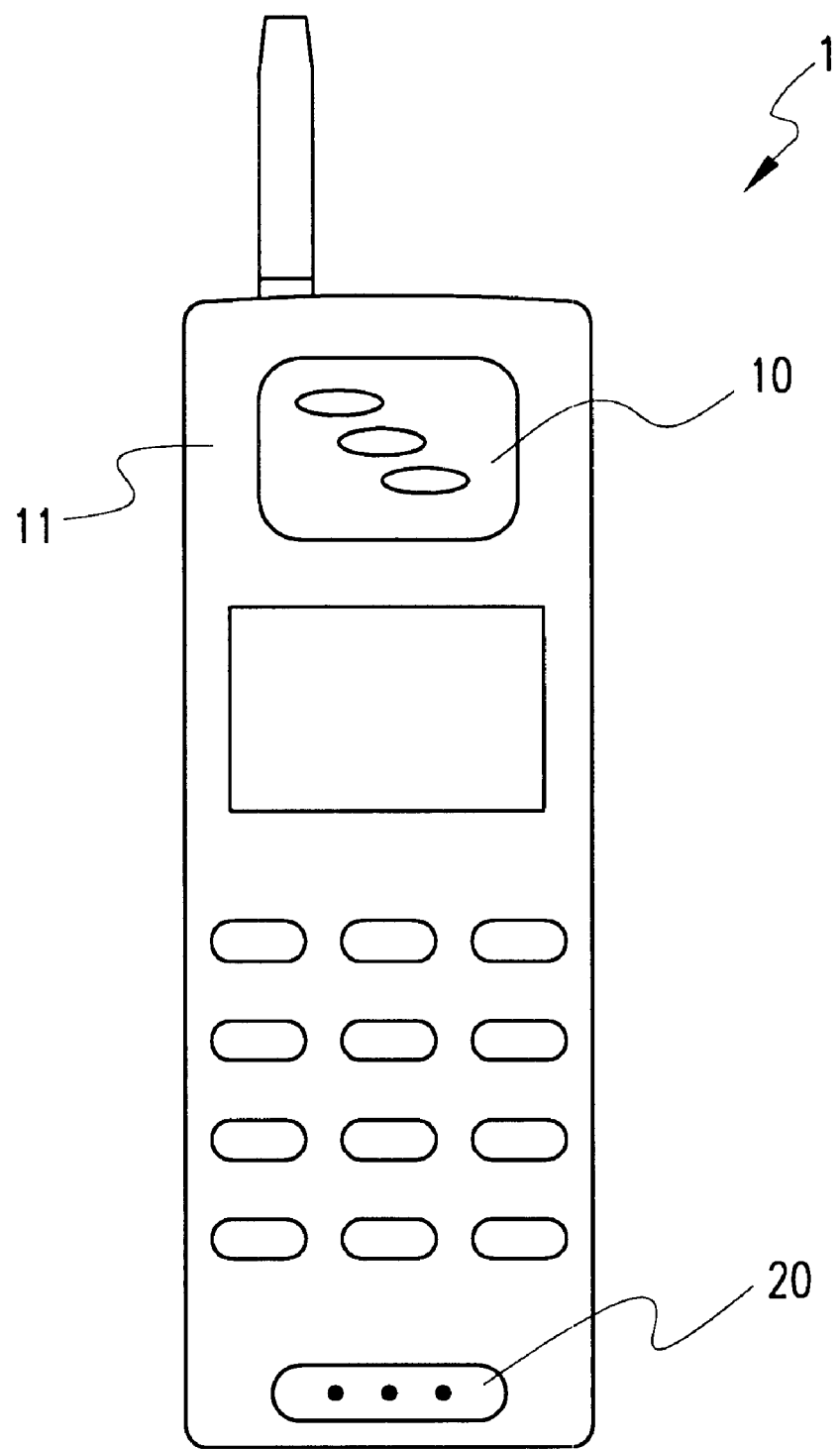
FIG. 1 illustrates an exemplary telecommunication instrument in which the principles of the present invention may be advantageously practice.

A preferred embodiment of the present invention and its advantages are best understood by referring to FIGS. 1–4 of the drawings, like numerals being used for like and corresponding parts of the various drawings. Referring to FIG. 1, an exemplary telecommunication instrument in which the principles of the present invention may be advantageously practice is depicted generally at 1. It should be understood that although the exemplary telecommunication instrument of FIG. 1 is configured as a wireless telecommunication instrument, such as a cordless telephone or cellular handset, the principles of the present invention are not limited to wireless telecommunication instruments. Rather, persons of ordinary skill in the art will recognize that the principles of the present invention are equally applicable to other telecommunication instruments, such as wireline telephones, tethered or wireless headsets and other instruments that perform telecommunication functions. In other words, the exemplary telecommunication instrument of FIG. 1 is for the purpose of illustration, and not limitation.

Referring again to FIG. 1, the exemplary telecommunication instrument includes a microphone 20 for generating an uplink signal that is processed and eventually transmitted to a far-end party via a communication line or radio air interface. The exemplary telecommunication instrument also includes a side-tone mechanism (not shown in FIG. 1) that enables users to hear their own voice in the earphone 20 and therefore compensates for the fact that a user's ear can be completely or partially covered by an earphone mechanism 11. As will be described in further detail below, this side-tone mechanism advantageously adds a portion of the uplink signal generated by the microphone 20 to a downlink signal received from a far-end party to produce an output signal supplied to the earphone 20.

Figure 2:
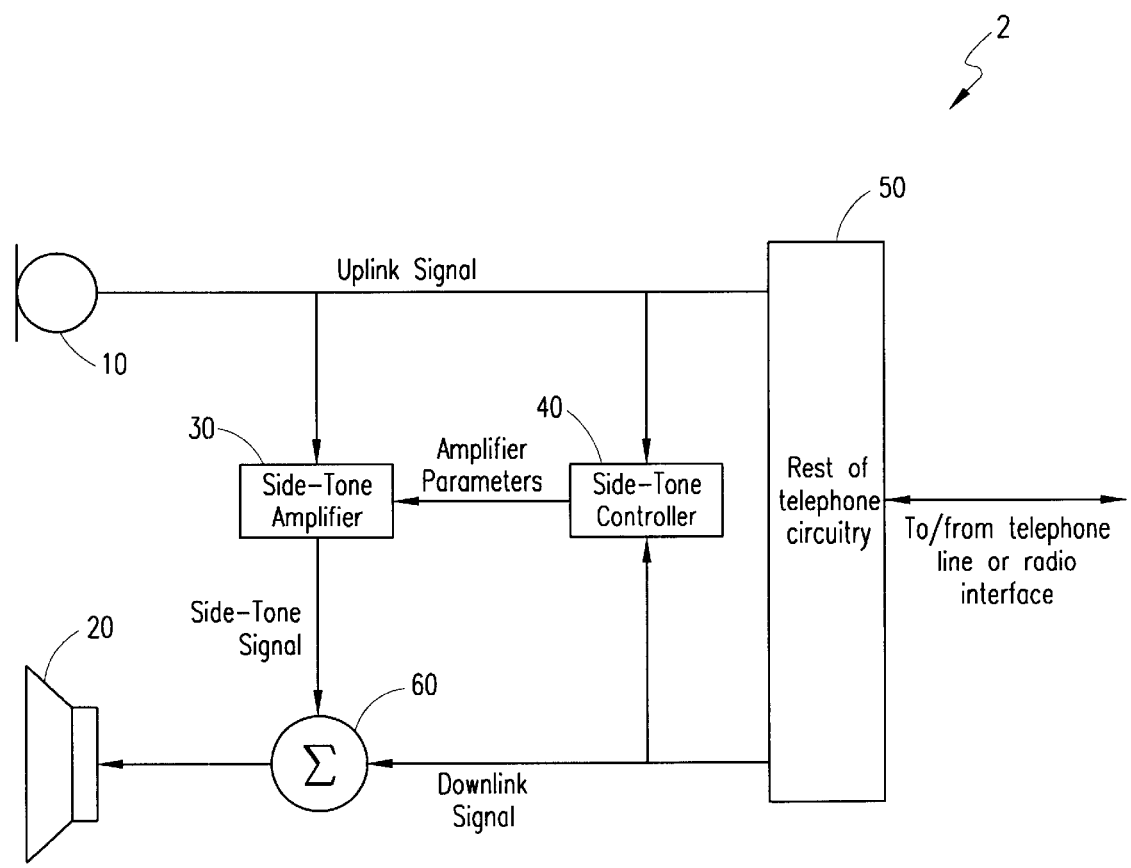
FIG. 2 illustrates an exemplary block diagram of the exemplary telecommunication instrument that provides side-tone control in accordance with the principles of the present invention.

Referring to FIG. 2, an exemplary block diagram of the exemplary telecommunication instrument that provides side-tone control in accordance with the principles of the present invention is depicted generally at 2. The exemplary telecommunication instrument of FIG. 2 can be viewed as having an uplink signal path and a downlink signal path that enables a user to carry on a two-way conversation with a far-end party. In the uplink signal path, an uplink signal generated by the microphone 10 is processed by telephone circuitry 50 and eventually transmitted to a far-end party via a communication line or radio air interface. In the downlink signal path, a downlink signal received from the far-end party over the communication line or radio air interface is processed by the telephone circuitry 50 and converted into a form suitable for output.

The exemplary telecommunication instrument of FIG. 2 also includes a side-tone mechanism coupled between the uplink signal path and the downlink signal path that adds a portion of the uplink signal to the downlink signal to generate the output signal supplied to the earphone 20. The side-tone mechanism includes a side-tone amplifier 30 having a transfer function adjustably controlled in accordance with one or more amplifier parameters. These amplifier parameters maybe configured, for example, to adjustably control the gain of the side-tone amplifier 30, the frequency response of the side-tone amplifier 30 or a combination of the gain and frequency response of the side-tone amplifier 30. A side-tone controller 40 is coupled to the side-tone amplifier 30 and is configured to apply the amplifier parameters to the side-tone amplifier 30 to adjustably control the side-tone amplifier's transfer function. Notably, the side-tone controller 40 selects the amplifier parameters to be applied to the side-tone amplifier 30 in accordance with the detected energy of the uplink signal and the detected energy of the downlink signal.

In one aspect of the present invention, the side-tone controller 40 periodically measures the energy level of the uplink signal and the energy level of the downlink signal (e.g., every 1–2 seconds), and selects the particular amplifier parameters to be applied to the side-tone amplifier 30 based on both the measured uplink signal energy and the measured downlink signal energy. For example, if the side-tone controller 40 detects a low uplink signal energy and a low downlink signal energy (e.g., neither the user nor the far-end party are speaking), the side-tone controller 40 may apply amplifier parameters to the side-tone amplifier 30 that produce a moderate attenuation of the uplink signal. If the side-tone controller 40 detects a high uplink signal energy and a low downlink signal energy (e.g., only the user is speaking), the side-tone controller 40 may apply amplifier parameters to the side-tone amplifier 30 that also produce a moderate attenuation of the uplink signal. If the side-tone controller 40 detects a high uplink signal energy and a high downlink signal energy (e.g., both the user and the far-end party are speaking), the side-tone controller may apply amplifier parameters to the side-tone amplifier 30 that produce standard (relatively low) attenuation of the uplink signal in accordance with standard recommendations. Finally, if the side-tone controller 40 detects a low uplink signal energy and a high downlink signal energy (e.g., only the far-end party is speaking), the side-tone controller 40 may apply amplifier parameters to the side-tone amplifier 30 that produce a high attenuation of the uplink signal. Because the above-described process defines four points in a three-dimensional space, the attenuation levels associated with intermediate uplink and downlink signal energies may be obtained by performing, for example, hyper-plane interpolation.

Once the side-tone controller 40 applies the selected amplifier parameters to the side-tone amplifier 30, the side-tone amplifier 30 produces a side-tone signal in accordance with the transfer function associated with the selected amplifier parameters. The side-tone signal is then added to the downlink signal received from the far-end party via a summer 60 to produce the output signal supplied to the earphone 20. As will be appreciated, the side-tone mechanism of FIG. 2 properly takes into account the varying needs of side-tone control that occur in a two-way conversation, and adjustably controls the side-tone signal so as to reduce the potentially adverse effects of the side-tone signal on the quality of the output signal supplied to the earphone 20.

Figure 3:
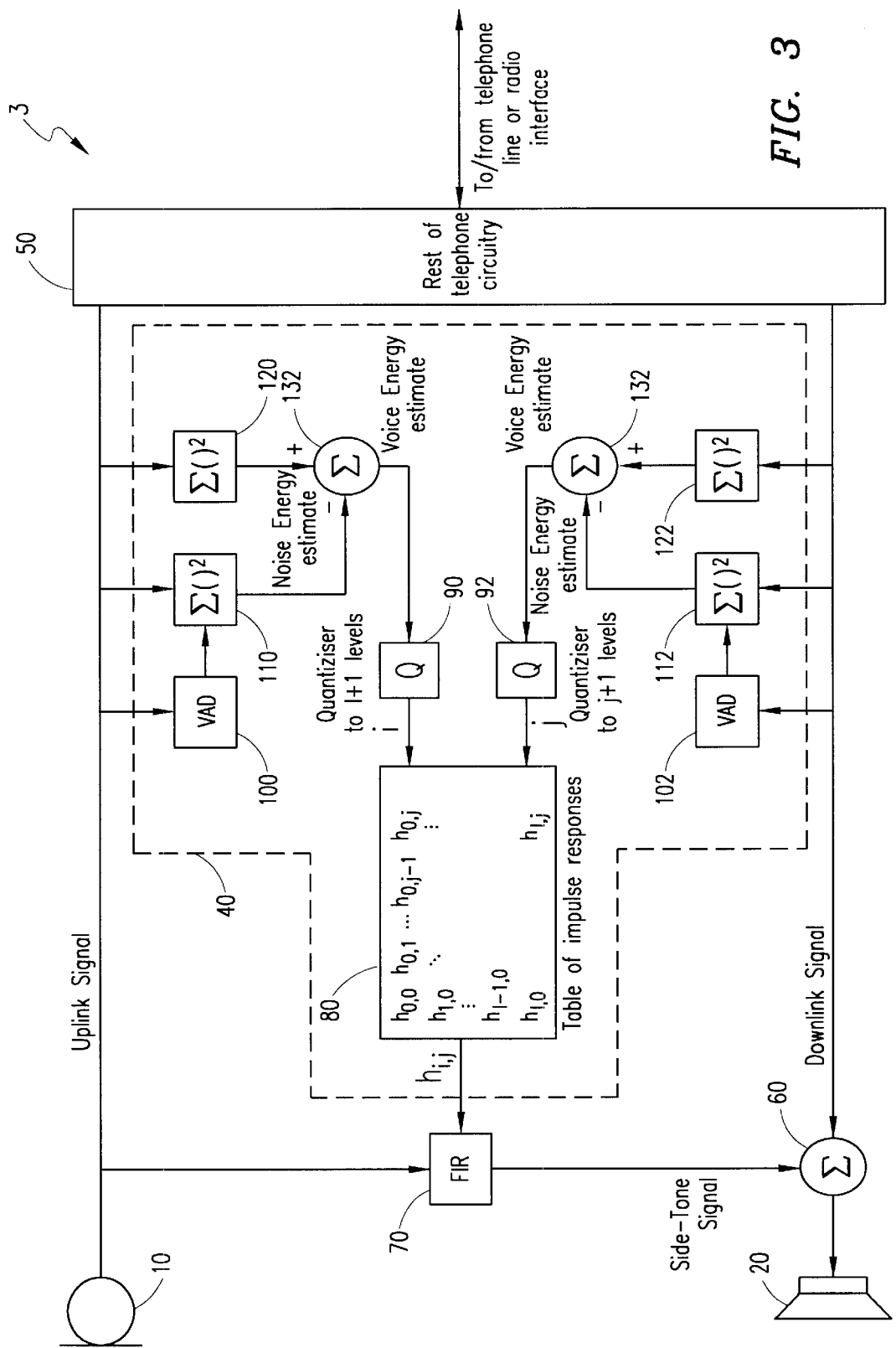
FIG. 3 illustrates one embodiment of a side-tone mechanism in accordance with the principles of the present invention.

Referring to FIG. 3, one embodiment of the side-tone mechanism in accordance with the principles of the present invention is depicted generally at 3. The embodiment of FIG. 3 includes a finite impulse response (FIR) filter 70 for generating a side-tone signal in accordance with a set of impulse response coefficients ($h_{ij}$) which control the transfer function of the FIR filter 70. The embodiment of FIG. 3 also includes a table 80 of impulse response coefficients within the side-tone controller 40, where the side-tone controller 40 selects a particular set of impulse response coefficients to be applied to the FIR filter 70 based on an estimated voice energy of the uplink signal and an estimated voice energy of the downlink signal.

The estimated voice energy of the uplink signal may be determined using a voice activity detector (VAD) 100, a noise energy estimator 110 and an uplink signal energy estimator 120. During periods with no uplink voice activity, the VAD 100 activates the noise energy estimator 110, causing the noise energy estimator 110 to estimate the noise energy of the uplink signal. During periods with voice activity, the VAD 100 deactivates the noise energy estimator 110, and the noise energy estimate previously generated by the noise energy estimator 110 is subtracted from the uplink signal energy estimate generated by the uplink signal energy estimator 120 via summer 130 to generate a voice energy estimate of the uplink signal.

The estimated voice energy of the downlink signal may be determined in a similar manner using a VAD 102, a noise energy estimator 112 and a downlink signal energy estimator 122. During periods with no downlink voice activity, the VAD 102 activates the noise energy estimator 112, causing the noise energy estimator 112 to estimate the noise energy of the downlink signal. During periods with voice activity, the VAD 102 deactivates the noise energy estimator 112, and the noise energy estimate previously generated by the noise energy estimator 112 is subtracted from the downlink signal energy estimate generated by the downlink signal energy estimator 122 via summer 132 to generate a voice energy estimate of the downlink signal.

The voice energy estimate of the uplink signal and the voice energy estimate of the downlink signal are then quantized via respective quantizers 90, 92 to form an index into the table 80 of impulse response coefficients. The side-tone controller 40 can then apply to the FIR filter 70 the set of impulse response coefficients associated with the index to adjustably control the transfer function of the FIR filter 70. The sets of impulse response coefficients stored in the table 80 may be determined in accordance with the principles described above with respect to the embodiment of FIG. 2 to adjust an attenuation level of the uplink signal.

As such, the embodiment of FIG. 3 can also be configured to adjust the frequency response of the FIR filter 70 based on the voice energy estimate of the uplink signal and the voice energy estimate of the downlink signal in order to emphasize the voice signal. For example, the table 80 may be configured so that a low voice energy estimate of the uplink signal and a high voice energy estimate of the downlink signal indexes a set of impulse response coefficients. For this embodiment, the table 80 is initially filled with impulse response coefficient values that are typically used for the existing, non-adaptable solutions. The side-tone mechanism advances through each noise environment (e.g., determined from the input Voice and Noise Energy estimates), and for each such noise environment, adjusts the coefficients in table 80 that correspond to that environment so as to increase the intelligibility of the speech signal. The table 80 may also be configured so that a high voice energy estimate of the uplink signal and a low voice energy estimate of the downlink signal can also index a set of impulse response coefficients so as to increase the intelligibility of the speech signal.

Although, as described above, an adjustment can be made to the attenuation level (gain) of the uplink signal or the frequency response of the FIR filter, in order to control the side-tone amplifier, certain non-linear signal processing approaches can also be used. For example, the side-tone can be controlled by dynamic compression of the signal in the side-tone path.

Notably, as described above, one embodiment of the present invention can use voice and noise energy levels of uplink and downlink signals as inputs for selectively applying a set of amplifier parameters to a side-tone amplifier. However, the present invention is not intended to be limited to the use of such voice and noise energy levels and can also include, for example, the use of such input parameters as the spectral density of the voice and/or noise signals, or the crest-factor of such signals.

Figure 4:
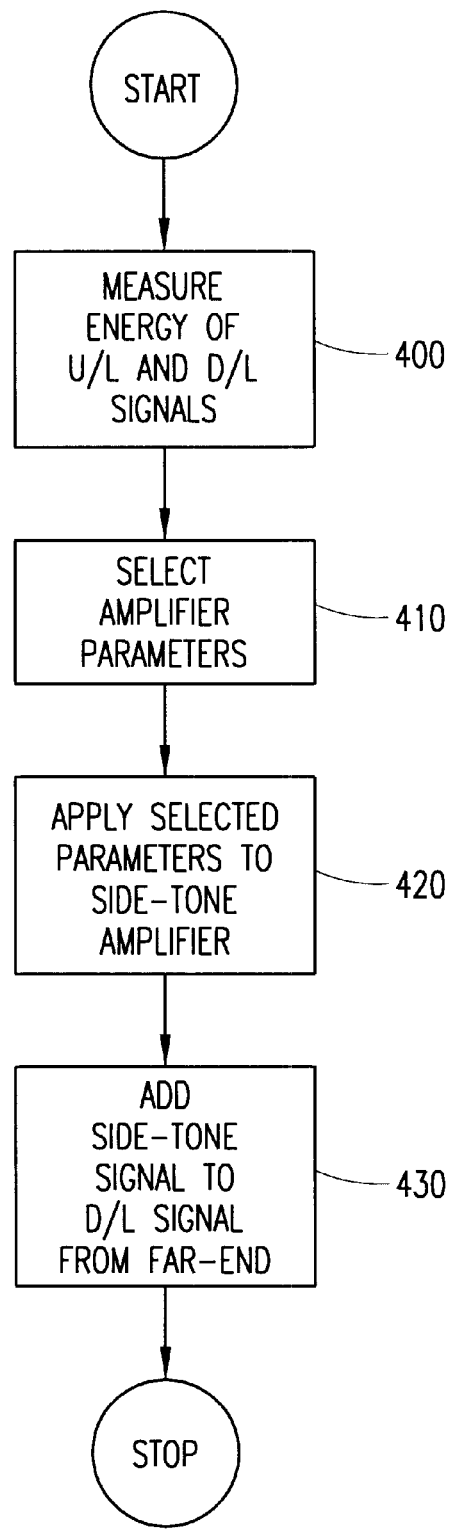
FIG. 4 illustrates an exemplary method in flow chart form in which the principles of the present invention may be advantageously practiced.

Referring to FIG. 4, an exemplary method in flow chart form in which the principles of the present invention may be advantageously practiced is depicted generally at 4. The exemplary method periodically measures an energy level of the uplink signal and the energy level of a downlink signal at step 400. Alternatively, the exemplary method can measure the voice energy level of the uplink signal and the voice energy level of the downlink signal by subtracting a noise energy estimate of the uplink signal from the energy level of the uplink signal, and subtracting a noise energy estimate of the downlink signal from the energy level of the downlink signal, respectively. Amplifier parameters are then selected based upon the energy level (or voice energy level) of the uplink signal and energy level (or voice energy level) of the downlink signal in accordance with the above-described principles at step 410. The selected amplifier parameters are then applied to a side-tone amplifier to adjustably control the transfer function of the side-tone amplifier in accordance with the selected amplifier parameters at step 420. At step 430, the side-tone signal generated by the side-tone amplifier can then be added to the downlink signal received from a far-end party to generate an output signal supplied to an earphone.

Although preferred embodiment(s) of the method and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for providing side-tone control for a telecommunication instrument, comprising the steps of:

measuring an energy of an uplink signal and an energy of a downlink signal;

selecting at least one amplifier parameter for controlling a transfer function of a side-tone amplifier based on said energy of said uplink signal and said energy of said downlink signal;

applying said amplifier parameters to said side-tone amplifier; and adding an output of said side-tone amplifier to said downlink signal to produce an output signal.

2. The method of claim 1, wherein the selecting step comprises selecting at least one amplifier parameter for controlling a gain of said side-tone amplifier based on said energy of said uplink signal and said energy of said downlink signal.

3. The method of claim 1, wherein the selecting step comprises selecting at least one amplifier parameter for controlling a frequency response of said side-tone amplifier based on said energy of said uplink signal and said energy of said downlink signal.

4. The method of claim 1, further comprising the step of storing a plurality of amplifier parameters in a table.

5. The method of claim 4, wherein the selecting step comprises selecting said at least one amplifier parameter to be applied to said side-tone amplifier from said plurality of amplifier parameters stored in said table by indexing said table in accordance with at least one quantized value of said energy of said uplink signal and said energy of said downlink signal.

6. The method of claim 5, wherein said side-tone amplifier comprises a finite impulse response filter.

7. The method of claim 1, wherein the measuring step comprises estimating a voice energy of said uplink signal and a voice energy of said downlink signal.

8. The method of claim 7, wherein the selecting step comprises selecting said at least one amplifier parameter based on an estimated voice energy of said uplink signal and an estimated voice energy of said downlink signal.

9. A side-tone control unit, comprising:

a side-tone amplifier including a transfer function selectively controlled in accordance with at least one amplifier parameter;

a side-tone controller coupled to said side-tone amplifier, for selectively applying said at least one amplifier parameter to said side-tone amplifier based on a detected energy of an uplink signal and a detected energy of a downlink signal; and a summer for adding an output of said side-tone amplifier to said downlink signal to produce an output signal.

10. The side-tone control unit of claim 9, wherein the said at least one amplifier parameter controls a gain of said side-tone amplifier.

11. The side-tone control unit of claim 9, wherein the said at least one amplifier parameter controls a frequency response of said side-tone amplifier.

12. The side-tone control unit of claim 9, further comprising a table of amplifier parameters that stores a plurality of sets of amplifier parameters.

13. The side-tone control unit of claim 12, wherein said side-tone controller is configured to select a set of amplifier parameters from said plurality of sets of amplifier parameters stored in said table by indexing said table in accordance with at least one quantized value of said detected uplink signal energy and said detected downlink signal energy.

14. The side-tone control unit of claim 13, wherein said side-tone amplifier comprises a finite impulse response filter, and said at least one amplifier parameter comprises a set of impulse response coefficients.

* * * * *